United States Patent [19]
Rossberg et al.

[11] Patent Number: 5,412,746
[45] Date of Patent: May 2, 1995

[54] OPTICAL COUPLER AND AMPLIFIER

[75] Inventors: Rolf Rossberg, Schwieberdingen; Rainer Fritschi, Korntal-Münchingen; Jürgen Otterbach, Leonberg; Rolf Heidemann, Weinsberger, all of Germany

[73] Assignee: Alcatel N. V., Amsterdam, Netherlands

[21] Appl. No.: 216,187

[22] Filed: Mar. 22, 1994

[30] Foreign Application Priority Data

Mar. 30, 1993 [DE] Germany .................. 43 10 291.3

[51] Int. Cl.⁶ .......................... G02B 6/00; G02B 6/36
[52] U.S. Cl. .......................................................... 385/48
[58] Field of Search ............................ 385/39, 43, 48

[56] References Cited

U.S. PATENT DOCUMENTS

| | | | |
|---|---|---|---|
| 4,398,795 | 8/1983 | Palmer | 385/48 X |
| 4,557,552 | 12/1985 | Newton et al. | 385/48 X |
| 4,786,130 | 11/1988 | Georgiou et al. | 385/48 |
| 4,810,052 | 3/1989 | Fling | 385/48 X |
| 5,031,984 | 7/1991 | Eide et al. | 385/27 |
| 5,071,214 | 12/1991 | Jacob et al. | 385/48 X |
| 5,315,675 | 5/1994 | Dennis et al. | 385/48 X |

FOREIGN PATENT DOCUMENTS

| | | |
|---|---|---|
| 0371675 | 6/1990 | European Pat. Off. . |
| 2654085 | 6/1977 | Germany . |
| 3120051 | 3/1982 | Germany . |
| 4030068 | 4/1992 | Germany . |

OTHER PUBLICATIONS

Makoto Shimizu, "Compact And Highly Efficient Fiber Amplifier Modules Pumped By A 0.98-$\mu$m Laser Diode", pp. 291–296, Journal Of Lightwave Technology, vol. 9, No. 2, Feb. 1991.

Nobuyuki Kagi, "Temperature Dependence Of The Gain In Erbium–Doped Fibers", pp. 261–265, Journal Of Lightwave Technology, vol. 9, No. 2, Feb. 1991.

Journal Of Lightwave Technology, Bd. 9, No. 2, Feb. 1991, pp. 261–265, Kagi et al, "Temperature Dependence Of The Gain In Erbium–Doped Fibers".

*Primary Examiner*—Akm E. Ullah
*Attorney, Agent, or Firm*—Frishauf, Holtz, Goodman & Woodward

[57] ABSTRACT

A coupler (1) made of optical fibers is provided with a device for detecting the light that is carried in one of the fibers at the coupler output in operation. For that purpose, the coupler (1) embedded in an enclosure (2) has at the coupler output a lens body (8) enclosing the optical fiber (pigtail 6) and a detector (9) aimed at the lens body (8). With the detector, during coupler operation, lost light dissipated via the primary coating of the optical fiber is received by the lens body (8) and carried by the detector (9) to an electrical evaluator.

3 Claims, 1 Drawing Sheet

OPTICAL COUPLER AND AMPLIFIER

BACKGROUND OF THE INVENTION

Invention relates to an optical coupler.

Couplers of this kind are used in optical communications systems, in particular, for instance in optical fiber amplifiers. These amplifiers are inserted into optical transmission paths and amplify the signal light carried in a transmission line. To enable controlling the light output, it is desirable to measure the input power, output power or pump power of the amplifier, for instance.

Optical fiber amplifiers in which the signal light or pump light is detected at the end of a free branch on the output side of the pump coupler are known from two articles in the Journal of Lightwave Technology, Vol. 9, No. 2, February 1991, pp. 261–265 and pp. 291–296. Depending on the pump coupler used, a strong polarization dependency of the light may occur.

The object of the invention is to provide a coupler made up of optical fibers in a system for monitoring the light carried in the fiber at the coupler output during operation.

BRIEF DESCRIPTION OF THE DRAWING

The invention will be described in further detail below in terms of an exemplary embodiment shown in a drawing. The drawing shows an optical coupler with a system for detecting the dissipated lost light.

DETAILED DESCRIPTION

Figure 1:
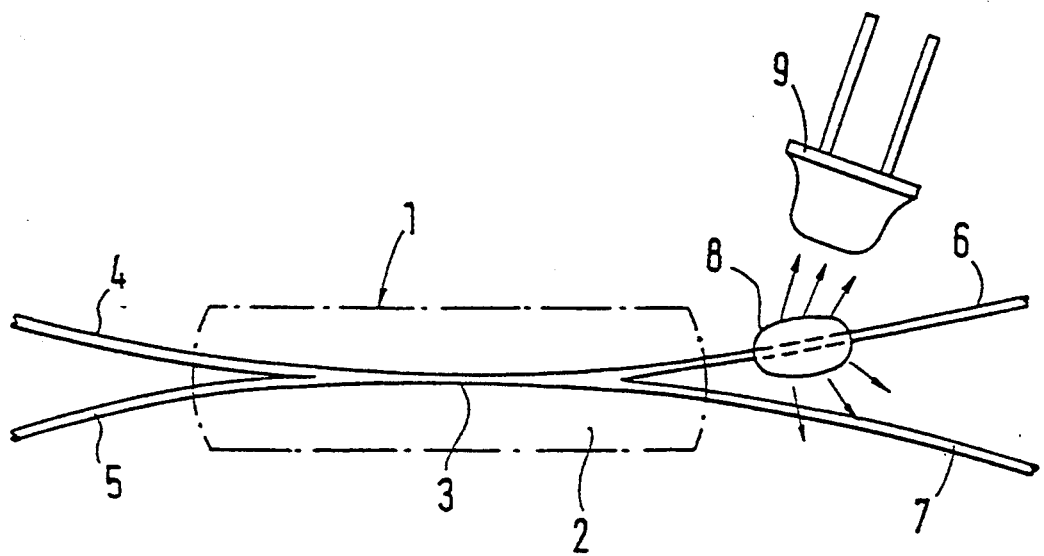

In the drawings, the optical coupler is identified overall by reference numeral 1. It comprises a coupling zone or region 3, embedded in a schematically shown enclosure 2, and a plurality of optical fibers 4, 5, 6, 7 protruding from the enclosure 2 on two diametrically opposed sides. The fibers may be mono- or multi-mode fibers of quartz glass (silica), borosilicate glass or polymer optical fibers (POF) made or plastic, and the coupler 1 thus produced may be a coupler of the polished type or the fusion type. In the exemplary embodiment shown it is a wavelength-selective version in an X configuration, with two input-side pigtails 4, 5 and two output-side pigtails 6, 7.

The arrangement for monitoring the light at the coupler 1 comprises a lens body 8, enclosing the primary-coated optical fiber of a light-carrying pigtail 6 located at the coupler output a short distance from the enclosure 2, and a detector 9 aimed at the lens body 8.

In contrast to the residual light present in the other output branch (pigtail 7), the light united in the coupler branch of the first pigtail 6 is generally not dependent on the direction of polarization. Depending on the wavelength of the light that is to be detected, suitable photodiodes (detector 9) can be selected, or suitable filters can be placed in front of them.

The lens body 8 is made from a transparent plastic that has an index of refraction equal to, or even better, higher than, the primary coating of the optical fiber (pigtail 6). For producing the lens body 8, a drop of a curable adhesive placed on the pigtail 6 is suitable, for instance, and a large-surface-area photodiode may for instance be used as the detector 9. The coupler 1 with the enclosure 2, lens body 8 and detector 9, preferably forms a unit whose parts are firmly joined together mechanically, that is, making a component that can be manipulated separately.

If the component is used in an optical amplifier with the same travel direction for the signal light and the pump light, then the signal light is united with the pump light at the input to the amplifier, via the coupler 1. In amplifier operation, however, unavoidable losses occur in the coupler 1, which can amount to as much as 0.5 dB. The lost light is therefore necessarily dissipated at the output-side pigtails 6, 7 of the coupler 1 via the primary coating of the fibers. It has been found that this is still the case even with light at a wavelength of from 1550 nm up to several centimeters of fiber length. Some of this lost light, which amounts to only a few percent of the quantity of light carried in the fiber, is collected in the lens body 8, projected onward, received by the detector 9, and carried by it to an electrical evaluator (not shown). With the aid of the component, it is therefore possible to monitor whether a light signal is present, or possibly conclusions can be drawn about the magnitude of the transmitted optical power in the fiber path connected to the component.

We claim:

1. An optical coupler and amplifier comprising:
    a coupling region (3) embedded in an enclosure (2) and having several optical fibers protruding from the enclosure on two diametric sides and forming input and output light-conducting pigtails (4, 5, 6, 7) for incoming and outgoing optical waveguides, respectively, said optical fibers having a primary coating formed thereon at least 0n a mid-portion thereof outside the coupling region;
    a lens body (8) mounted on the mid-portion of an output light-conducting pigtail (6) of the optical coupler, the lens body (8) surrounding the primary coating on the output light-conducting pigtail (6) on which said lens body is mounted; and
    a detector (9) pointed at the lens body (8) mounted on the mid-portion of the output light-conducting pigtail for receiving light from the lens body; and
    wherein the lens body (8) is disposed at a short distance from the enclosure (2) so as to receive a lost light being dissipated in the primary coating of the output light-conducting pigtail.

2. An optical coupler and amplifier as claimed in claim 1, wherein the optical coupler (1) is a polished or fused fiber coupler formed from single- or multi-mode silica, borosilicate-glass or plastic fibers.

3. An optical coupler and amplifier as claimed in claim 1, wherein the lens body (8) comprises a cured drop of an adhesive which has a higher refractive index than the refractive index of the primary coating of the output light-conducting pigtail (6).

* * * * *